Figure 1:
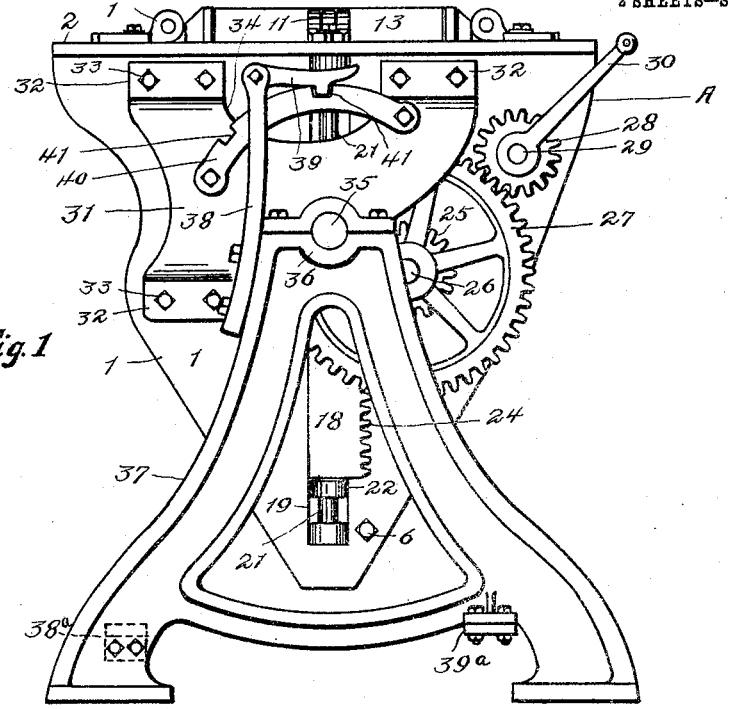

No. 783,299. PATENTED FEB. 21, 1905.
J. M. McDOWELL.
MACHINE FOR MOLDING PLASTIC BLOCKS.
APPLICATION FILED APR. 15, 1904.

2 SHEETS—SHEET 1.

WITNESSES:
H. D. Kanode

INVENTOR
Joseph M. McDowell

BY
Shepherd & Parker
ATTORNEYS

No. 783,299. PATENTED FEB. 21, 1905.
J. M. McDOWELL.
MACHINE FOR MOLDING PLASTIC BLOCKS.
APPLICATION FILED APR. 15, 1904.
2 SHEETS—SHEET 2.
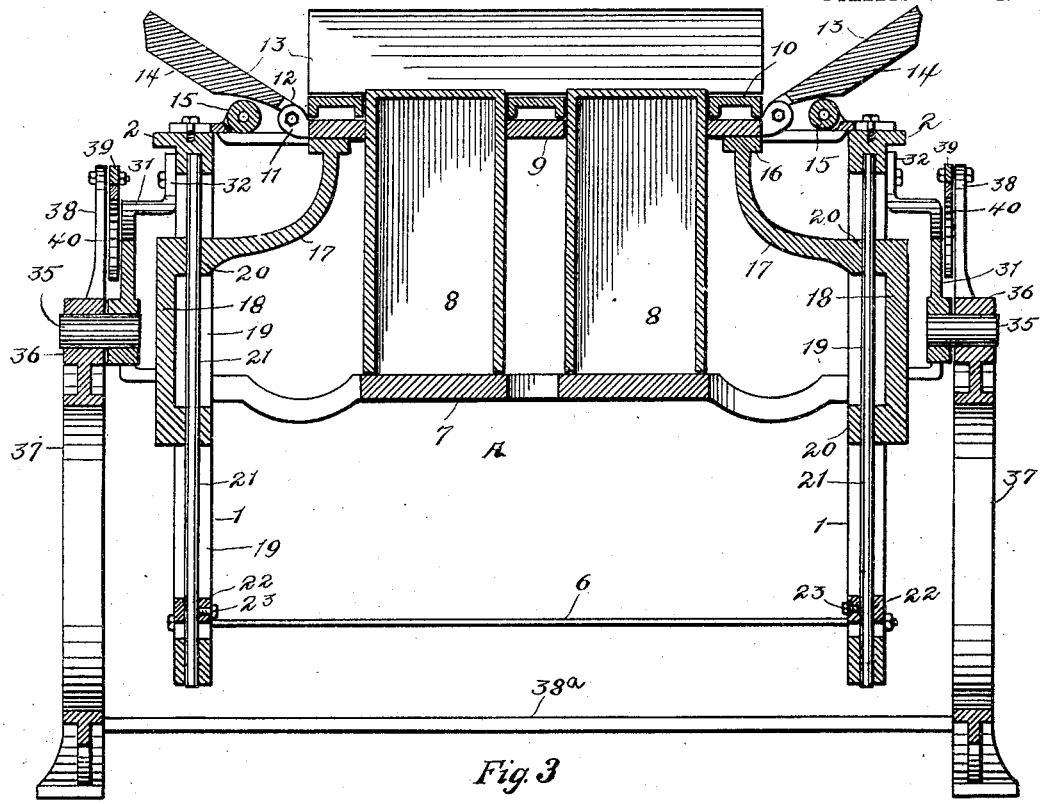
Fig. 3
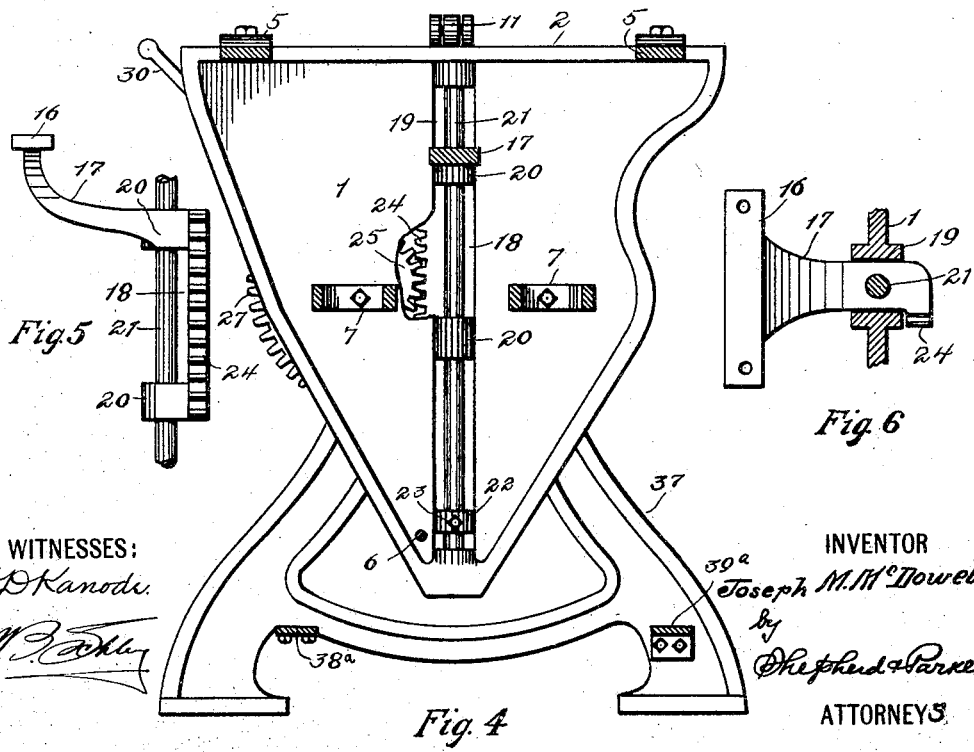
Fig. 5  Fig. 6
Fig. 4
WITNESSES:
H. D. Kanode
M. W. J. Ashley
INVENTOR
Joseph M. McDowell
by
Shepherd & Parker
ATTORNEYS No. 783,299. Patented February 21, 1905.

UNITED STATES PATENT OFFICE.

JOSEPH M. McDOWELL, OF COLUMBUS, OHIO.

MACHINE FOR MOLDING PLASTIC BLOCKS.

SPECIFICATION forming part of Letters Patent No. 783,299, dated February 21, 1905.

Application filed April 15, 1904. Serial No. 203,335.

*To all whom it may concern:*

Be it known that I, JOSEPH M. MCDOWELL, a citizen of the United States, residing at Columbus, in the county of Franklin and State of Ohio, have invented a certain new and useful Improvement in Machines for Molding Plastic Blocks, of which the following is a specification.

My invention relates to a new and useful improvement in plastic-block-molding machines.

The object of the invention is to provide a pivoted body that may be readily tilted forward in order that a waterproofing or ornamental coating may be applied to the side of the mold, so that the block may be formed face forward instead of face down, as has heretofore been the practice.

Another feature lies in the adjusting means whereby the bed-plate may be readily raised or lowered.

Finally, the object of the invention is to provide a device of the character described that will be strong, durable, and efficient and simple and comparatively inexpensive to make and one in which the several parts will not be liable to get out of order.

With the above and other objects in view the invention consists of the novel details of construction and operation, a preferable embodiment of which is described in the specification and illustrated in the drawings, wherein—

Figure 2:
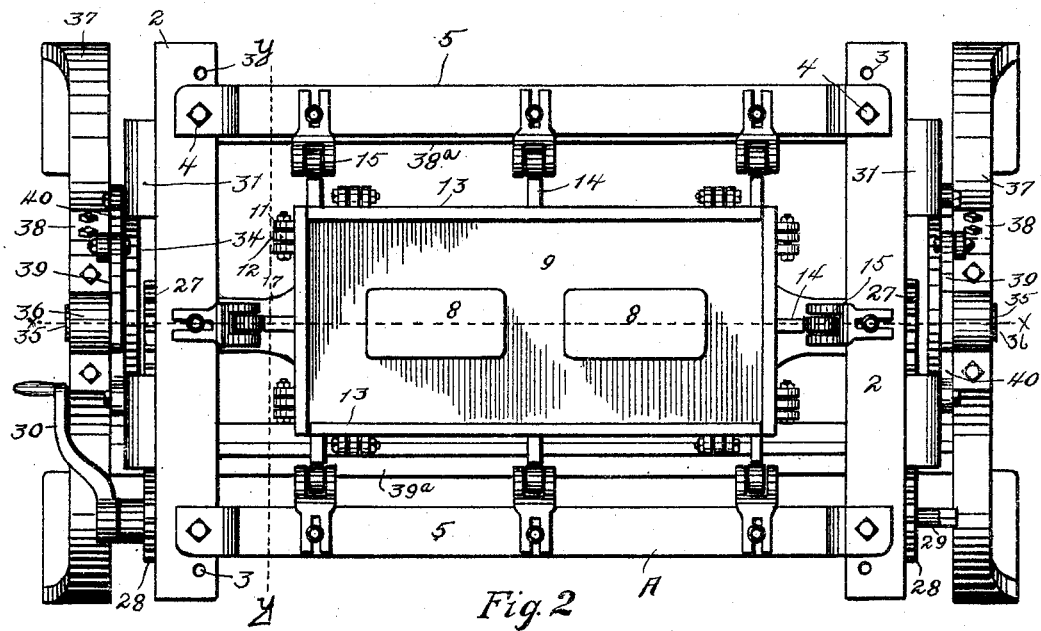

Figure 1 is an end elevation. Fig. 2 is a plan view. Fig. 3 is a longitudinal sectional view taken on the line $x\ x$ of Fig. 2. Fig. 4 is a vertical sectional view taken on the line $y\ y$ of Fig. 2. Fig. 5 is a detail elevation of the rack and its adjacent parts, and Fig. 6 is a detail plan view of the parts shown in Fig. 5.

In the drawings the numeral 1 designates the end plates, which are preferably of a triangular shape, having their apexes inverted and formed along their upper ends with overhanging flanges 2, provided with apertures 3, adapted to receive bolts 4, which pass through the upwardly-curved ends of longitudinal connecting-bars 5. Any number of these apertures 3 may be provided, and the bolts 4 of the bars 5 may be engaged with any of these apertures to adjust the width of the frame to accommodate molds of various sizes. The end plates 2 are connected at their lower ends by a rod 6, which is suitably secured thereto.

Supported between the end plates 1 and nearer their upper ends is a frame-plate 7, which is fixedly secured and supports fixed cores 8. Sliding on the cores 8 is a bed-plate 9, which supports the pallet 10 and is provided with hinge-lugs 11, placed on each side of its four corners and adapted to receive the hinge members 12 of the pivoted doors 13. The doors or hopper-plates 13 are provided with outwardly-projecting ribs 14, which engage antifriction-rollers 15, adjustably mounted on the connecting-bars 5 and the flanges 2. It will be readily seen by an observation of Fig. 3 that upon lowering the bed-plate 9 the doors 13 will be closed by the rollers 15, which bear against the ribs 14.

The bed-plate 9 is supported on transverse flanges 16, formed integral on the upper ends of the curved arms 17. The arms 17 are integral extensions of sliding blocks 18, which are guided in vertical slots 19, formed central of the end plates 1. The blocks 18 are provided with lugs 20, having openings through which guide-rods 21 pass. The guide-rods extend from the bottom to the top of the end plates in the center of the slot 19 and are fixedly secured by any suitable means. Vertically adjustable on the guide-rods 21 are collars 22, provided with set-screws 23, by which they may be fastened at any point along the guide-rods 21, and thus limit the downward movement of the blocks 18. Integral racks 24 are formed on each of the blocks and project laterally on the outside of the plates 1. The racks are engaged by pinions 25, which are mounted on suitable shafts 26, supported on the outer sides of the plates 1 and having keyed on their outer ends a large gear-wheel 27. The gear-wheel 27 is revolved by a pinion 28 meshing therewith and secured upon a shaft 29, suitably rotatably mounted on the outside of the end plate 1, which carries a crank 30. It will thus be seen that upon turning the crank 30 the pinion 28 meshing with the gear 27 will cause the latter to turn and set in motion the pinion 25, which meshing with the rack will raise or lower the sliding block 18, according to the direction in which the crank 30 is turned, and the block 18, supporting the bed-plate 9, through the extending arms 17 will raise or lower the same, the downward movement being limited by the collar 22, which has been previously set at the desired point.

Secured upon the outer sides of the end plate 1 and nearer the upper portions thereof are trunnion-plates 31, which are bowed out to allow the sliding blocks 18 free movement and formed with flanges 32, by which they are secured to the end plate, preferably by bolts 33. The central upper portion of each trunnion-plate is cut away at 34, so as to afford the sliding blocks 18 unlimited vertical movement. The plates 31 are provided with trunnions 35, suitably secured thereto and having their outer ends supported in boxes 36, formed on the upper ends of standards 37, which latter are connected by longitudinal bars $38^a$ and $39^a$. Projecting upwardly and secured to the rear side of each of the standards 37 is a bracket 38, which has pivotally secured to its upper end a dog 39. A segment 40, having notches 41, adapted to be engaged by the dog 39, is bolted to the outer side of the trunnion-plate 31. Thus it will be seen that the frame may be locked either in its level position or in its tilted position by merely engaging the pawl 39 in the notches 41 when the frame is swung to either of the said positions.

It is obvious that by raising the dogs 39 the frame A may be tilted forward and the dogs 39 engaged in the notches 41 at the rear end of the segments 40. The bed-plate 9 having been raised by the means hereinbefore described, the doors 13 will rest in the open position shown in Fig. 3, and thus when the frame A is in its tilted position the front door 13 will lie in substantially a horizontal plane, thus allowing a waterproofing or ornamenting coating to be applied thereto, when the dogs 39 may again be lifted and the frame tilted back to its original position, the bed-plate 9 being lowered through the medium of the sliding blocks 18 and the rack 24 and the gears 25, 27, and 28. Said doors will be closed by the ribs 14 contacting with the antifriction-rollers 15. Thus the bed-plate will be lowered until it rests on the frame-plate 7 and the mold thus formed. The machine is now in position to receive the plastic material, which is placed in the molds about the fixed cores 8 and tamped until the block has been formed, when the bed-plate 9 may again be raised, the cores remaining fixed and the doors opening, as shown in Fig. 3. The block is now removed, and the operations described may be repeated to form other blocks. It will be observed that by applying the coating to the side of the mold instead of to the bottom the block may be formed face forward instead of face down and that the coating may be much more expeditiously and efficiently applied and that a better block will be produced.

I do not wish to limit myself to the exact details of construction and operation herein set forth, as I may make various changes in the same without departing from the spirit of my invention.

Having now fully described my invention, what I claim, and desire to secure by Letters Patent, is—

1. In a machine of the type set forth, a frame, a bed-plate movable within the frame, hinged doors secured to the bed-plate, slidable means guided by the frame and supporting the bed-plate, means for moving the slidable means, standards for pivotally supporting the frame whereby it may be tilted, and means for locking the frame into position.

2. In a machine of the type set forth, the combination with hinged doors and a movable bed-plate supporting the same, of a frame comprising end plates having vertical guide-slots, rods supported within the slots, blocks sliding on the rods within the slots, arms projecting inwardly from the blocks and supporting the bed-plate, means engaging with the blocks for sliding the same, trunnions supported from the end plates, standards supporting the trunnions, and means for locking the frame in position.

3. In a machine of the type set forth, the combination with fixed cores and a vertically-movable bed-plate, of a frame comprising end plates having vertical guide-slots, guide-rods secured within the guide-slots, blocks sliding on the rods within the slots, means for limiting the downward movement of the blocks, arms projecting from the blocks and supporting the bed-plate, racks formed integral with the slide-blocks, gears engaging with the rack for vertically moving the slide-blocks, and means for pivotally supporting the end plates.

4. In a machine of the type set forth, the combination with a movable bed-plate, of sliding blocks having integral upwardly-extending arms supporting the bed-plate, integral racks projecting from the blocks, means for slidably supporting the blocks, means for sliding the blocks, and adjustable means for limiting the downward movement of the blocks.

JOSEPH M. McDOWELL.

In presence of—
A. L. PHELPS,
W. L. MORROW.